April 27, 1965   D. SHOEMAKER   3,180,050
FISHING LURE
Filed Oct. 24, 1963
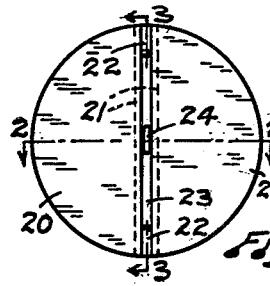
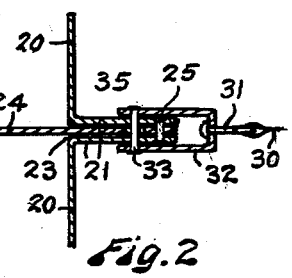
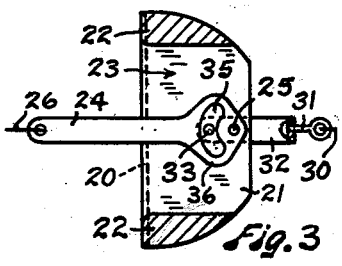
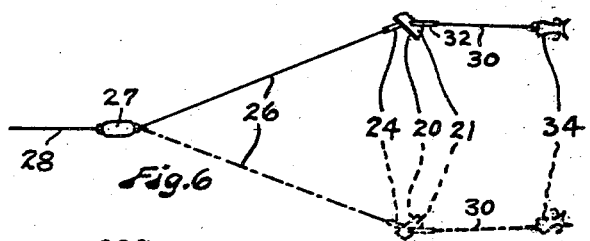
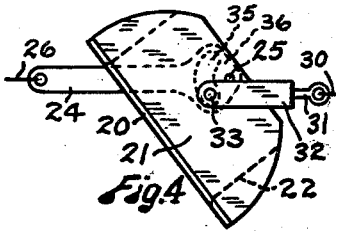
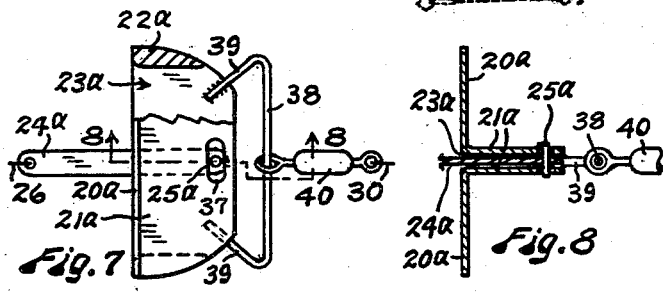
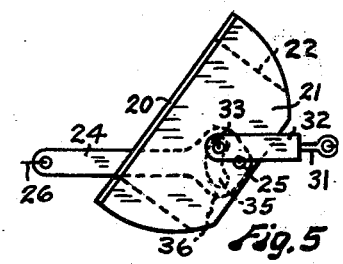
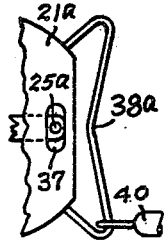
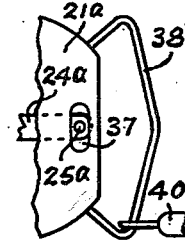
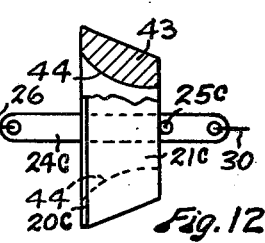
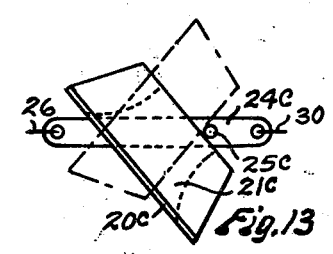
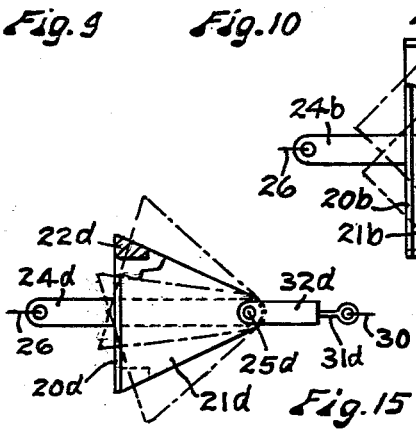
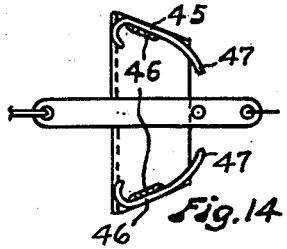
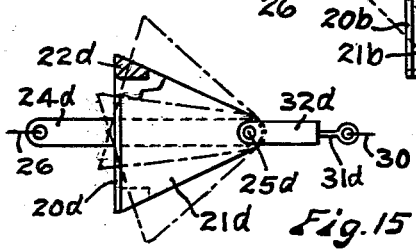
INVENTOR.
Douglas Shoemaker
BY Fred C. Matheny
ATTORNEY

United States Patent Office 3,180,050
Patented Apr. 27, 1965

3,180,050
FISHING LURE
Douglas Shoemaker, 3106 100th Ave. NE.,
Bellevue, Wash.
Filed Oct. 24, 1963, Ser. No. 318,572
7 Claims. (Cl. 43—42.03)

My invention relates to a fishing lure.

An object of my invention is to provide a lure capable of use as a bait activator in a line of tackle in which the lure is positioned a short distance in advance of a bait to activate the bait and cause the bait to move from side to side in a darting or wabbling fashion attractive and alluring to fish.

Another object is to provide a lure which also acts as a flasher to attract fish and cause them to strike a bait which is connected with the lure.

A further object is to provide a bait activator and flasher type lure including a lure body which has a water reaction surface positioned forwardly of a pivotal point of connection of a trolling line with the lure body making the lure body unstable so that it will tend to oscillate or tiltingly move back and forth when the water reaction surface thereof is subjected to water pressure, as by trolling the lure through the water, and to further connect bait and hook means with said lure in such a manner as to hold the lure body in each maximum tilted position for a long enough time to cause the lure to dart from side to side in the water thereby imparting a darting action to the bait and hook means.

Another object is to provide a bait actuator and flasher type lure comprising two similar body members of thin flat material, each having a face flange and a side flange disposed approximately at right angles to each other, said two body members being secured together with their side flanges in registration and parallel and spaced a short distance apart and their face flanges approximately in a common plane and extending away from each other so as to form a water reaction surface, said secured together body members having a draw link extending between them and pivotally connected with them at a point rearwardly of said water reaction surface and preferably near the rear edge of said side flanges and having means for connecting a lure or a snell line to which bait and hooks are attached to the said side flanges.

Other objects of my invention will be apparent from the following description taken in connection with the accompanying drawings.

In the drawings:

FIGURE 1 is a front elevation of a fishing lure constructed in accordance with my invention.

FIG. 2 is a sectional view taken substantially on broken line 2—2 of FIG. 1.

FIG. 3 is a view partly in section and partly in elevation taken substantially on broken line 3—3 of FIG. 1.

FIG. 4 is a side view of the lure shown in FIGS. 1, 2 and 3, with the lure body in a position of maximum incline in one direction.

FIG. 5 is a view similar to FIG. 4 showing the lure body in a position of maximum incline in an oposite direction.

FIG. 6 is a diagrammatic view illustrating the operation of the lure shown in FIGS. 1 to 5.

FIG. 7 is a side view, with parts broken away, showing a lure of modified form.

FIG. 8 is a sectional view taken substantially on broken line 8—8 of FIG. 7.

FIG. 9 is a fragmentary elevational view of a modified form of the lure shown in FIGS. 7 and 8.

FIG. 10 is a fragmentary elevational view of another modified form of the lure body shown in FIGS. 7 and 8.

FIG. 11 is an elevational view, with parts broken away, showing still another modified form of lure body of the type shown in FIGS. 7 to 10, two inclined positions which said lure body may assume in operation being shown by dot and dash lines.

FIG. 12 is an elevational view, with parts broken away and parts shown in cross section, of still another modified form of lure body.

FIG. 13 is a side elevation of the lure body shown in FIG. 12, illustrating in full lines one maximum inclined position and by dot and dash lines another maximum inclined position of said lure body.

FIG. 14 is an elevational view, with one half of the lure body removed, illustrating a modification of the lure shown in FIGS. 12 and 13 in which adjustable means are provided for limiting the amount of tilt of the lure body.

FIG. 15 is an elevational view, with parts broken away, of still another modified form of lure, two maximum inclined positions of the lure body being indicated by dot and dash lines.

Like reference numerals refer to like parts throughout the several views.

In this description the lure parts shown at the left in all figures are referred to as forward or front parts and those shown at the right as rear parts.

The lure shown in FIGS. 1 to 6 comprises two similar body members formed of thin flat light-reflective material, each having a face flange 20 and a side flange 21 disposed substantially at right angles to each other. The two duplicate side flanges 21 are positioned in registration and parallel with each other and are spaced apart a short distance and rigidly attached together by marginally disposed spacer and stop members 22. This provides between said side flanges 21 a narrow space 23 for the reception of a draw link 24.

The rear end of the draw link 24 is connected by a draw link pivot 25 with the two side flanges 21. The pivot 25 is positioned a substantial distance to the rear of the water reaction surface formed by the front flanges 20 and near the rear edge of the side flanges 21. The draw link 24 extends a substantial distance forwardly from the plane of the front flanges 20 and its forward end is connected by a line or leader 26 with a sinker 27, FIG. 6. The sinker 27 is connected with a suitable fish line 28. A short piece of line or leader 30, herein termed a snell line, is herein disclosed as having its forward end connected by an eye member 31 and clevis type bait connector member 32 and pivot 33 with the side flanges 21, the pivot 33 being positioned between the draw link pivot and the front flanges 20 and a short distance forwardly of the draw link pivot 25. The rear or trailing end of the snell line 30 has a bait 34 connected with it, said bait including at least one fish hook. The bait 34 or any suitable conventional lure can be connected directly with the eye member 31 and the snell line dispensed with if desired.

I prefer to construct the draw link 24 with an enlarged rear end part 35 having a clearance slot 36 through which pivot 33 passes. This leaves the body members free to move angularly relative to the draw link 24 between the two maximum inclined positions in which they are shown in FIGS. 4 and 5 respectively and in FIG. 6.

It will be noted that the two pivots 25 and 33 lie in a common plane which is mid way between the two lateral edges of the front flanges so that the body member will have the same tendency to swing to one side as the other. If the axes of these two pivots were coincident, that is if both draw link 24 and clevis 32 were connected with the same pivot then the body member would flutter or swing back and forth from side to side with very little darting movement when the front flanges 20 were subjected to water pressure, as in trolling or fishing in flowing water. Positioning the pivot member 33 which connects the hook means with the side flanges 21 forwardly of the pivot 25 which connects the draw link 24 with these side flanges suppresses or slows down the fluttering action of the body member and causes it to dart in one direction from one inclined position then to reverse its inclined position and dart in an opposite direction. This makes the body member efficient as a flasher and further imparts to the bait 34 a darting movement which has proved to be alluring to fish.

In the modified form of lure shown in FIGS. 7 and 8 the two duplicate members which form the lure body are similar to the previously described body members shown in FIGS. 1 to 6 in that each comprises a front flange 20a and a side flange 21a. The two front flanges 20a form the water reaction surface. The side flanges 21a are secured together in parallel spaced apart relation by two marginally positioned spacer and stop members 22a and provide therebetween a space 23a for the reception and operation of a draw link 24a. The rear end of the draw link 24a is provided with a transverse draw link pivot member 25a which can be rigid with the link 24a and extends in both directions therefrom and is received within slots or enlarged holes 37 in the side flanges 21a. This provides self adjustment or sliding movement of the draw link pivot 25a relative to the side flange 21a. A self adjusting connection between the lure body and a snell line 30 is also provided in the lure shown in FIGS. 7 and 8. This self adjusting connection comprises a cross bar 38 having end portions 39 which are soldered or otherwise rigidly secured between the side flanges 21a. The bar 38 is thus secured to the side flanges 21a and is spaced a short distance rearwardly from the rear edges of said side flanges 21a and extends across the lure approximately in the plane of the draw link 25a. A swivel 40 has a sliding connection with said cross bar 38 and a snell line 30 is secured to said swivel 40. The cross bar 38 can be straight, as shown in FIG. 7 or it can be bent or bowed toward the adjacent side flanges 21a, such as the cross bar 38a shown in FIG. 9, or it can be bent or bowed away from said flanges 21a, such as the cross bar 38b shown in FIG. 10.

The lures shown in FIGS. 7 to 10 operate in a manner similar to the previously described lures shown in FIGS. 1 to 6 in that they assume first an inclined position in one direction and then an inclined position in an opposite direction and dart from side to side when the water reaction surface formed by the two front flanges 20a is subjected to water pressure, as by trolling the lure through the water. The sliding movement of the swivel 40 along the bar 38 or 38a or 38b and the self adjustment of pivot pin 25a in the slot 37 both modify the operation of the lure by suppressing the tendency of the body member to flutter or oscillate rapidly and causing it to dart from side to side.

In the modified form of lure shown in FIG. 11 two duplicate members which form the lure body each comprise a front flange 20b and a side flange 21b. These two body members are positioned with their front flanges 20b in the same plane to form a water reaction surface and their side flanges 21b in closely spaced apart parallel juxtaposed relation and the said side flanges 21b are secured together by marginally positioned stop and spacer members 41, which are herein shown to be integral parts of a cross bar 42. The cross bar 42 is similar to the cross bar 38 of FIGS. 7 and 8. A draw link 24b extends between the side flanges 21b and is connected with said side flanges 21b by a draw link pivot 25b. The forward end of the draw link 24b is adapted to have a leader 26 connected with it and a swivel 40 is slidably engaged with the cross bar 42 and connected with a snell line 30 of the form shown in FIG. 6. The lure shown in FIG. 11 is of a different shape than the lure shown in FIGS. 7 and 8 and the pivot 25b thereof is fixed relative to the side flanges 21b and does not have any self adjustment or transverse sliding movement but the general mode of operation of the lure shown in FIG. 11 is similar to the mode of operation of the lure shown in FIGS. 7 and 8 in that it will dart from side to side when trolled through the water.

In the modified form of lure shown in FIGS. 12 and 13 two duplicate members which form the lure body each comprise a front flange 20c and a side flange 21c. These two members are positioned with their front flanges 20c in the same plane and with their side flanges 21c in closely spaced apart parallel juxtaposed relation and said side flanges 21c are secured together by marginally positioned stop and spacer members 43. A draw link 24c extends entirely through the lure body between the side flanges 21c and is provided with a draw link pivot member 25c which is rigid with said draw link 24c and rests against the rear edges of the side flanges 21c. Preferably the inner edges 44 of the spacer members 43 are curved so they will tend to roll on the edges of the draw link 24c as the lure body moves angularly on the link. A snell line 30 is connected to the rear end of the draw link 24c. In the operation of the lure shown in FIG. 12 and FIG. 13 the lure body can assume the two angular positions indicated. The sliding or self adjusting movement of the draw link pivot 25c helps to suppress fluttering motion of the lure body and causes it to dart back and forth in the water in a manner previously described.

FIG. 14 shows a lure similar to the lure shown in FIGS. 12 and 13 except that the stop and spacer members 43 of FIGS. 12 and 13 are replaced by stop and spacer members 45 of bendable wire. Said wire members 45 have their forward end portions soldered or welded or brazed to the side flanges, as indicated by 46, and have rear end portions 47 which are loose and unattached as respects the side flanges of the lure body and can be bent toward and away from each other to adjust their position relative to the draw link 24c and thus adjust the angle through which the lure body can move relative to said draw link and thereby vary the action of the lure in the water.

In the modified form of lure shown in FIG. 15 two duplicate members which form the lure body each comprise a front flange 20d and a side flange 21d positioned similarly to the flanges 20 and 21 of FIGS. 1 to 6 and secured together by marginal stop and spacer devices 22d and having a draw link 24d extending between them. The rear end of the draw link 24d is connected by a pivot 25d with the rear portions of the side flanges 21d. A clevis 32d is connected with the pivot 25d and has a swiveled eye member 31d by which it is connected with a snell line 30.

Because the draw link 24d and clevis 32d to which the snell line 30 attaches are both connected with the same pivot member 25d in FIG. 15, the body of this lure will oscillate or flutter back and forth between the two inclined positions in which it is shown by dot and dash lines. Thus the lure will wabble rather than dart from side to side when it is drawn through the water.

All of the lures herein disclosed except the one shown in FIG. 15 operate in the manner diagrammatically illustrated in FIG. 6 when they are trolled through the water. The sinker 27 acts as a stabilizer and does not have much sidewise movement. When the lure body is inclined in one direction it will move or dart sidewise to a position, for instance, as shown uppermost by full lines in FIG. 6, at which position the pressure will cause it to assume the opposite incline and dart in an opposite direction, for instance to a position such as the position illustrated lowermost by dot and dash lines, where it will again reverse its incline, it being understood that the said lure body will be moving forwardly all of the time and that the positions which are illustrated opposite to each other in FIG. 6 will, in the actual use of the lure, be offset along the line of travel of the lure. As the lure body darts back and forth it will move the bait 34 back and forth in a darting manner alluring to fish.

The foregoing description and accompanying drawings clearly illustrate preferred embodiments of my invention but it will be understood that this disclosure is merely illustrative and that changes may be made within the scope of the following claims.

I claim:

1. In a lure, a substantially flat plate forming a water reaction surface, said plate having a slot therein; bracket means extending rearwardly from said plate; a draw link extending through the slot in said plate; pivot means positioned a substantial distance rearwardly from said plate and providing connection between the rear end portion of said draw link and said bracket means, the axis of said pivot means being parallel to said plate and perpendicular to a plane common to the longitudinal axis of said link and the longitudinal axis of said slot providing for swinging movement of said plate about said pivot from one side to the other of a position in which the plate is perpendicular to the longitudinal axis of the link, said plate constituting an unstable water reaction surface forwardly of said pivot means; and hook means connected with the rear end portion of said bracket.

2. A lure comprising two similar body members of thin flat material each formed of a face flange and a side flange disposed approximately at right angles to each other; means securing said two body members together with their two side flanges in registration with each other and substantially parallel and spaced a short distance apart and with their two face flanges positioned in a substantially common plane and extending away from each other and cooperating in forming a water reaction surface forwardly of the side flanges, said securing means being positioned marginally of said side flanges; a draw link operatively disposed between said parallel side flanges and extending forwardly beyond said face flanges and having a forward end portion adapted for connection with a fish line; a pivot member providing a connection between the rear end portion of said draw link and said parallel side flanges at a substantial distance rearwardly from the face flanges, said body members being angularly movable as a unit relative to said draw link and said marginally positioned securing means limiting angular movement between said body members and said draw link; and hook means connected with said side flanges.

3. A lure comprising two similar body members of thin flat material each consisting of a face flange and a side flange disposed approximately at right angles to each other; spacer and stop means securing said two body members together with their two side flanges in registration with each other and substantially parallel and spaced a short distance apart and with their two face flanges positioned in a substantially common plane and extending away from ecah other and cooperating in forming a water reaction surface forwardly of said side flanges, said spacer and stop means being positioned marginally of said side flanges; a draw link operatively disposed between said parallel side flanges and extending forwardly beyond the plane of said face flanges and having a forward end portion adapted for connection with a fish line; a draw link pivot providing pivotal connection between the rear end portion of said draw link and said side flanges at a substantial distance rearwardly from the face flanges; and a hook connector member pivotally conneced with said side flanges at a location forwardly of said draw link pivot.

4. The apparatus as claimed in claim 3 in which the hook connector member is connected with the side flanges by a pivot member which extends transversely through the two side flanges forwardly of the draw link pivot and in which the draw link is provided with a clearance opening through which said hook connector pivot member extends, said clearance opening affording angular movement between the lure body and the draw link.

5. A lure comprising two similar body members of thin flat material each consisting of a face flange and a side flange disposed approximately at right angles to each other; spacer and stop means securing said two body members together with their two side flanges in registration with each other and substantially parallel and spaced a short distance apart and with their two face flanges positioned in a substantially common plane and extending away from each other and cooperating in forming a water reaction surface forwardly of said side flanges, said spacer and stop means being positioned marginally of said side flanges; a draw link operatively disposed between said parallel side flanges and extending forwardly beyond the plane of said face flanges and having a forward end portion adapted for connection with a fish line; a draw link pivot pivotally connecting the rear end portion of said draw link with said side flanges a substantial distance rearwardly from said face flanges; a bar secured to said side flanges and spaced a short distance rearwardly from the rear edges of said side flanges and extending crosswise of said body members substantially in the plane of said draw link; and a snell line having its forward end slidably connected with said bar and having hook means connected with its trailing end portion.

6. The apparatus as claimed in claim 5 in which openings of substantially larger size than the diameter of said draw link pivot are provided in said side flanges receiving said draw link pivot and providing limited transverse floating self adjustment of said draw link pivot relative to said side flanges.

7. A lure comprising two similar body members of thin flat material each comprising a face flange and a side flange disposed approximately at right angles to each other; spacer and stop means positioned between marginal portions of said side flanges securing said two body members together with their two side flanges in registration with each other and substantially parallel and spaced a short distance apart and with their two face flanges positioned in a substantially common plane and extending away from each other and cooperating in forming a water reaction surface forwardly of said side flanges, said side flanges having substantially flush rear edge portions of substantial length; a draw link disposed between said spaced apart side flanges and extending forwardly and rearwardly from the two secured together body members; a fish line connected with the forward end of said draw link and having a sinker connected therewith; a snell line connected with the rear end of said draw link and having hook means connected therewith; and pivot means rigid with the rear end portion of said draw link and positioned in slidable engagement with the rear edge portions of said side flanges pivotally and adjustably connecting said draw link with the lure body formed by said two body members.

References Cited by the Examiner

UNITED STATES PATENTS 1,148,810  8/15  Wymore _____ 43—42.52 X
3,023,537  3/62  Madson _____ 43—43.13

ABRAHAM G. STONE, *Primary Examiner.*